United States Patent
Ydoate et al.

(10) Patent No.: US 6,910,568 B1
(45) Date of Patent: Jun. 28, 2005

(54) METHODS AND APPARATUS FOR DIVERTING ARTICLES FROM A CONVEYOR

(75) Inventors: Edward Ydoate, Louisville, KY (US); Steven Vann Schroader, Louisville, KY (US)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/770,514

(22) Filed: Feb. 4, 2004

(51) Int. Cl.[7] .............................................. B65G 47/10
(52) U.S. Cl. .................. 198/370.07; 198/367
(58) Field of Search ........................... 198/370.07, 367, 198/442, 436, 598

(56) References Cited

U.S. PATENT DOCUMENTS

| | | | | |
|---|---|---|---|---|
| 2,936,062 A | * | 5/1960 | Wilcox | 198/367 |
| 3,599,789 A | * | 8/1971 | Kurczak | 198/367 |
| 4,125,184 A | * | 11/1978 | Seragnoli | 198/442 |
| 4,298,117 A | | 11/1981 | Kobayashi et al. | |
| 4,643,291 A | * | 2/1987 | Counter et al. | 198/370.07 |
| 5,275,272 A | | 1/1994 | Ydoate | |
| 5,701,989 A | | 12/1997 | Boone et al. | |
| 5,769,204 A | | 6/1998 | Okada et al. | |
| 5,887,698 A | | 3/1999 | Soldavini | |
| 5,918,724 A | | 7/1999 | Terrell et al. | |
| 5,950,800 A | | 9/1999 | Terrell et al. | |
| 6,076,683 A | | 6/2000 | Okada et al. | |
| 6,131,723 A | | 10/2000 | Schroader et al. | |
| 6,491,154 B2 | | 12/2002 | Ydoate et al. | |

* cited by examiner

Primary Examiner—Joseph Valenza
(74) Attorney, Agent, or Firm—Burns, Doane, Swecker & Mathis, LLP (57) ABSTRACT

A diverting system for displacing articles from a conveying surface including a diverter blade adapted to be rotated about a rotary axis from a retracted position along the edge of the conveying surface to an extended position to displace the articles, the diverter blade having a pusher surface spaced apart from the rotary axis by a connecting portion of the blade. A section of the connecting portion located immediately downstream of the rotary axis extends away from the edge in the blade's retracted position to form a void, so that when the blade is in an extended position for diverting a leading (downstream) article, the presence of the void prevents contact between the diverter blade and a trailing (upstream) article. The trailing article can travel downstream past the axis even while the blade is in the extended position. Thus, the trailing article can be positioned closer to the leading article without risk of contacting the blade, thereby increasing the throughput of the system. The connecting portion can be freely pivotably connected to a section of the blade on which the pusher surface is disposed, with a shock absorber provided in order to soften impacts imparted to the articles by the pusher surface.

15 Claims, 6 Drawing Sheets

METHODS AND APPARATUS FOR DIVERTING ARTICLES FROM A CONVEYOR

FIELD OF THE INVENTION

The present invention relates to a diverter system and a diverter blade for diverting articles from a conveyor.

DESCRIPTION OF THE RELATED ART

Figure 1:
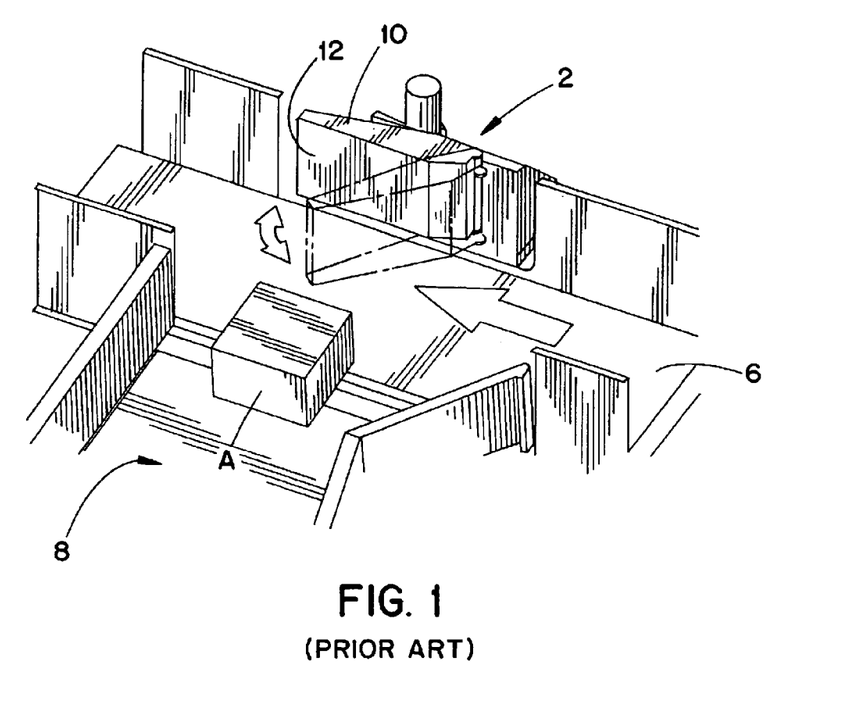
FIG. 1 is a perspective view of a prior art diverter system and conveyor.

In the conveying and sorting of articles, such as packages to be mailed or luggage to be routed and sorted, diverting systems can be arranged along a conveyor to divert some of the articles from the conveyor at a certain point or points along the conveyor. For example, as illustrated in FIG. 1, a package A can be diverted from the conveyor 6 into a chute or branch conveyor 8. A diverting system 2 includes a diverter blade or paddle 10 which strikes the package A and pushes the package A from the conveyor onto the chute or branch conveyor 8.

As illustrated in FIG. 1, the diverter blade 10 can have a generally planar front surface 12 which strikes the article A as the article A moves along the conveyor 6. The diverter blade 10 is pivoted into the pathway of the article A and then retracted into a retracted position on one side of the conveyor 6.

An example of a known diverter blade is illustrated in U.S. Pat. No. 5,918,724 to Terrell et al.

Because not all of the packages will be diverted at a particular chute or branch conveyor, it is desired that the diverting system can divert an individual package from the conveyor without the diverter blade or paddle interfering with a subsequent (trailing) package on the conveyor 6. Therefore, the articles are generally spaced apart on the conveyor far enough so that the blade or paddle will fully retract before the subsequent package reaches the pushing surface of the paddle. The overall throughput rate at which packages can be handled by the conveyer during a period of time is limited by the amount of space required between the subsequent packages.

One way to increase that rate is to shorten the time required for the blade to swing out and back across the conveyor, i.e., to increase the speed of the diverter blade or paddle. However, the inertia of the blade or paddle can limit the speed at which it can be driven. Further, the blade speed is also limited by a maximum speed at which the packages can be safely struck by the blade without damage.

It is also desirable to provide a diverter blade which has a length sufficient so that it will sweep across the entire width of the conveyor to effectively divert packages on the conveyer regardless of their lateral position. The length of such a diverter blade increases the amount of time required to sweep the diverter blade out and back over the conveyor and therefore will increase the required spacing between the subsequent articles, lowering the throughput of the system.

There is a need for a diverting system having a diverter blade which can sweep across the entire conveyor while maintaining a high package throughput rate, as well as a diverter blade which is less likely to damage a package upon impact therewith.

SUMMARY OF THE INVENTION

One aspect of the invention provides a diverter system for displacing articles from a conveying surface. The diverting system comprises a conveying surface having an edge and a diverter blade adapted to be rotated about a rotary axis from a retracted position along an edge of the conveying surface to an extended position to displace the articles from the conveying surface. The diverter blade has a pusher surface spaced apart from the rotary axis by a connecting portion. The diverter blade forms a void arranged between the axis and the pusher portion for enabling a subsequent article to pass downstream of the axis without contacting the blade while the blade is in the extended position.

Another aspect of the invention involves a method of diverting at least one article from a conveying surface with a diverter blade arranged at a side of the conveying surface. The method comprises pivoting the diverter blade about a rotary axis to move a pusher surface of the blade from a retracted position to a fully extended position over the conveying surface and then back to the retracted position in order to divert a leading article from the conveying surface. During that step, a trailing article is caused to enter a void of the blade, whereby the trailing article can pass downstream of the axis before the blade has been fully retracted.

The pusher portion can be connected to a mounting portion by a pivot and a shock absorber to minimize impact to the article.

BRIEF DESCRIPTION OF THE DRAWING FIGURES

The objects and advantages of the invention will become apparent from the following detailed description of preferred embodiments thereof in connection with the accompanying drawings in which the numerals designate like elements.

DETAILED DESCRIPTION OF PREFERRED EMBODIMENTS OF THE INVENTION

Figure 2A:
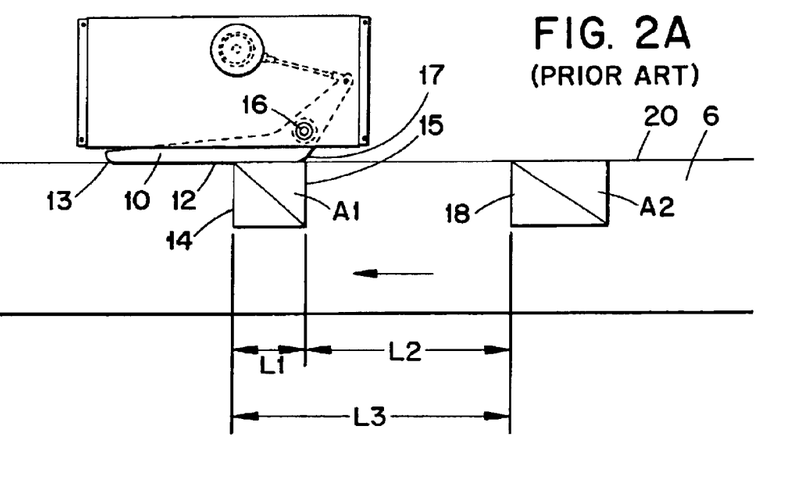
FIGS. 2A, 2B, and 2C illustrate the minimal package spacing, cycle time, and set-up time, respectively, in a prior art system.

FIG. 2A illustrates leading and subsequent (trailing) articles A1, A2 being fed along a conventional conveyor 6 that defines a longitudinal edge 20. A diverter blade 10 is arranged adjacent the edge 20 for rotation about a vertical rotary axis 16 for pushing selected articles from the conveyor.

The distance between leading edges of successive articles on the conveyor, i.e., the total package spacing, is designated as L3, which. comprises a cycle distance L2 and a set-up distance L1. The time required for the diverter blade to cycle, i.e., sweep outward across the conveyor and then return to its initial retracted position, is called the cycle time. The cycle distance L2 is the distance that the conveyor travels during the cycle time and thus is the minimum spacing between articles A1 and A2 (moving in a forward direction on the conveyor 6) to avoid interference between the diverter blade and the subsequent package A2 as the blade cycles. The time required for the front edge 14 of the lead article A1 to move from a position just before the article could be struck by the blade (e.g. the blade's rear corner 17) to the optimum strike position, is called the set-up time. The set-up distance L1, which the article A1 moves during the set-up time, is shown in FIG. 2A. The set-up time/distance depends upon the speed of the conveyor 6.

To ensure that the subsequent article A2 will not reach the diverter blade 10 before the diverter blade 10 is retracted out of the path of the article A2, the subsequent article A2 should be spaced behind the rear corner 17 of the diverter blade 10 by a cycle distance L2 at the time the blade begins its extension stroke. The distance L2 can be defined as the speed of the conveyor multiplied by the cycle time.

Therefore, assuming that the diverter blade begins its extension stroke when the rear edge 15 of the lead article A1 reaches a position that is even with the pivot axis 16, the package spacing L3 measured between forward edges of the articles A1 and A2 necessary to avoid interference between the subsequent package and the diverter blade is the sum of L1 and L2. The total time (set-up time plus cycle time) is the time required for an article to move the distance L3.

Figure 2B:
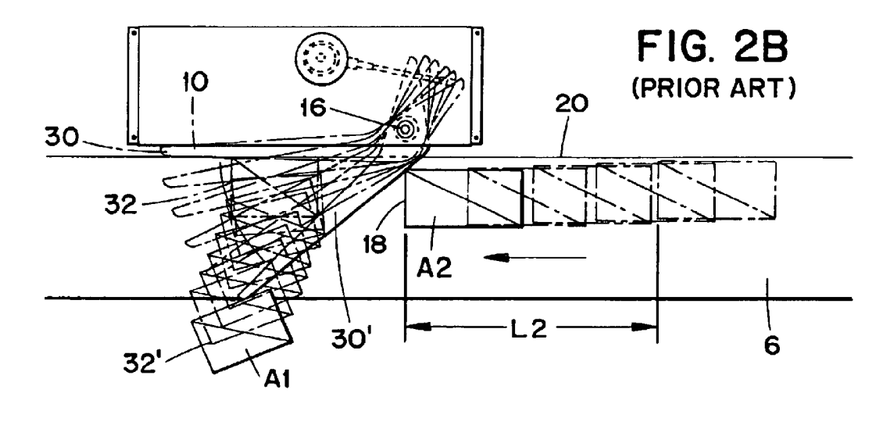

FIG. 2B illustrates the cycle time/distance relationship in greater detail. During the cycle time, the diverter blade 10 moves from a retracted position 30 along a longitudinal edge 20 of the conveyor 6 to a fully extended position designated as 30', and then returns to the retracted position 30. While traveling from the retracted position 30 to the fully extended position, the diverter blade 10 strikes the article A1 and pushes it from an initial position 32 to a position 32' at the opposite edge 22 of the conveyor 6. During the cycle time for the extension and retraction strokes, the subsequent article A2 is conveyed forwardly on the conveyor 6 by the cycle distance L2.

When the pusher surface 12 of the diverter blade 10 is a flat surface extending essentially from the rotary axis 16 to the forward free end 13 of the blade, the subsequent article A2 should be spaced far enough back so that the front edge 18 of the article A2 does not pass the rear corner 17 of the diverter blade 10 until the blade 10 has been fully retracted. Otherwise, if the article A2 is "hugging" the edge 20, it may strike a rear end of the blade and be undesirably diverted or delayed as it moves along the conveyor.

Figure 2C:
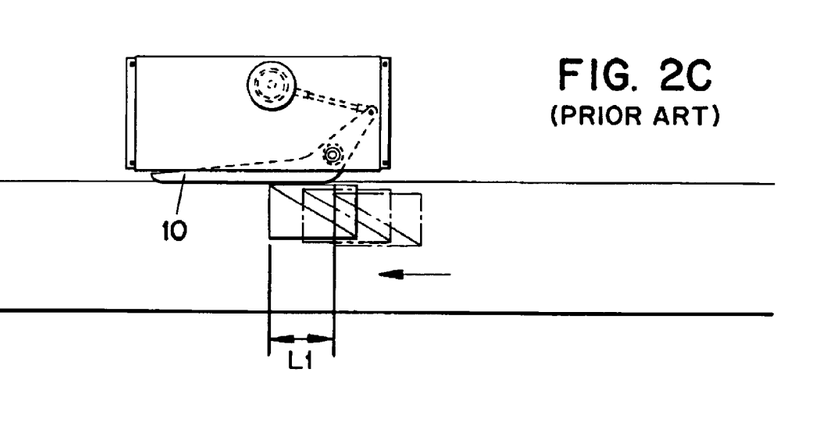

The setup distance L1 is illustrated in more detail in FIG. 2C. As illustrated in FIG. 2C, the setup distance L1 is the distance required for the front edge of the package A1 to pass the rear corner 17 and reach a predetermined optimum pushing position on the designated pusher surface 12 of the diverter blade, e.g., the "sweet spot" of the blade.

Figure 3:
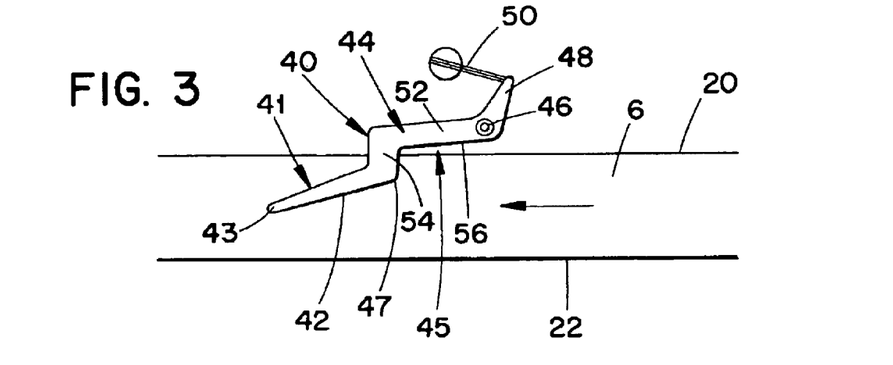
FIGS. 3A, 3B and 3C illustrate a top plan view of respective configurations of diverter blades in accordance with embodiments of the invention.

FIG. 3 illustrates an exemplary embodiment of a diverter blade 40 according to the present invention. The diverter blade 40 is mounted to rotate about a vertical rotary axis 16 arranged outside of an edge of a conveyor 6. The diverter blade 40 includes a pusher portion 41 having a pusher surface 42 for pushing the articles to the opposite edge 22 of the conveyor 6. The pusher surface 42 is spaced forwardly from the rotary axis 16 by a connecting portion 44 of the blade 40.

The connecting portion 44 has a rear section 52 which is disposed immediately forwardly of the rotary axis 16 and which has a surface 56 generally facing the conveyor. The connecting portion 44 is oriented non-parallel to the pusher portion and extends away from the edge 20 of the conveyor when the diverter blade is in the retracted position (see FIG. 4A). The intersection of the connecting portion 44 and the pusher portion 41 forms a step 54. The pusher surface 42 is oriented parallel to the edge 20 of the conveyor 6 in the blade's retracted position shown in FIG. 4A, although other orientations with respect to the edge 20 are possible. For example, the pusher surface 42 could be inclined relative to the edge 20 of the conveyor 6.

Figure 4A:
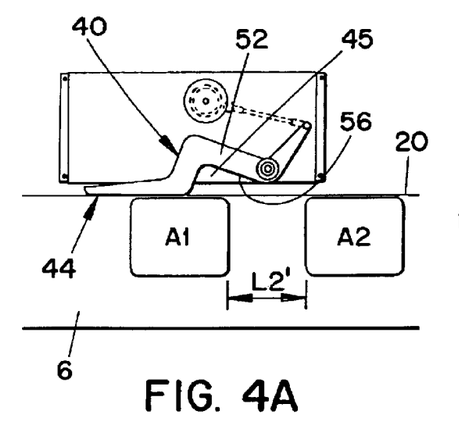
FIGS. 4A and 4B illustrate the starting position of an exemplary diverter blade and a conventional diverter blade, respectively.

The surface 56 of the connecting portion 44 is offset outwardly from the edge 20 of the conveyor 6 when the blade is in a retracted position and is positioned farther from the conveyor edge 20 than is the pusher surface 42, as shown in FIG. 4A. Further, the surface 56 of the connecting portion 44 is inclined forwardly and away from the edge 20 when the diverter blade 40 is in the retracted position.

The diverter blade 40 can optionally also have a crank section 48 that extends beyond the rotary axis 16. As illustrated in FIG. 3, the crank section 48 can be connected to any suitable torque transmitting member 50. The torque transmitting member 50 can be, for example, a motor and rotary linkage or piston arranged to move the crank section 48 through an arc about the rotary axis 16. Alternatively, it is envisioned that the rotary motion of the diverter blade 40 could be driven by a torque transmitting member (not shown) which acts directly on blade at the rotary axis 16 without connection to a blade end section.

Figure 3A:
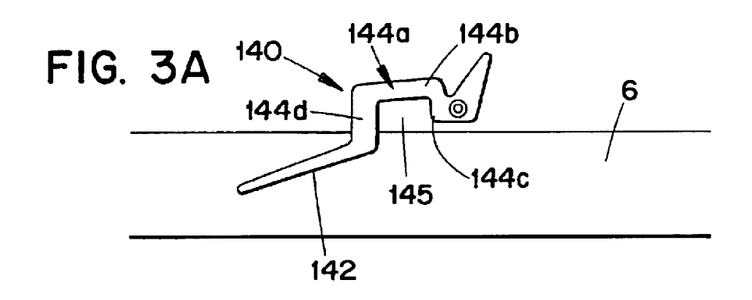
Figure 3B:
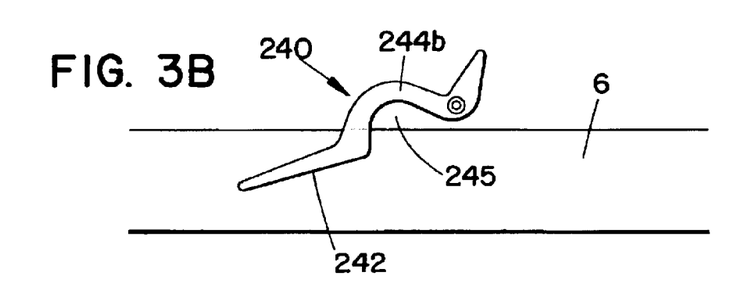

FIGS. 3A and 3B illustrate other-envisioned diverter blade embodiments in which the pusher surface is spaced forwardly from the rotary axis, and the rear section of the connecting portion disposed immediately forward of the rotary axis extends away from the conveyor edge in the blade's retracted position. For example, FIG. 3A illustrates a diverter blade 140 having a connecting portion 144a which includes a middle section 144b extending approximately parallel with the conveyor edge 20, and rear and front sections 144c, 144d which extend approximately parallel to one another.

As another example, FIG. 3B illustrates a diverter blade 240 having a connecting portion 244b which is curved away from the rotary axis 16 and away from the pusher surface 242.

Figure 3C:
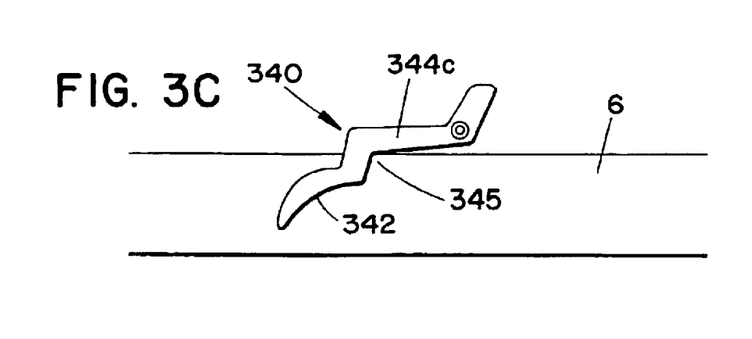

The pusher surface can have any surface shape suitable for pushing the articles across the conveying surface. For example, the pusher surface can be generally planar or curved. FIG. 3C illustrates an envisioned diverter blade 340 in which the pusher surface 342 of the diverter blade is curved concavely. In addition, although for convenience the figures show the pusher surface as a unitary structure, the pusher surface could be formed of several joined-together segments.

From the foregoing, it will be appreciated that each of the blades illustrated in FIGS. 3, 3A, 3B, and 3C has a void or pocket 45, 145, 245, or 345, respectively, formed in the connection portion 44, 144, 244, and 344 at the side of the blade which faces the articles on the conveyor.

Figure 4B:
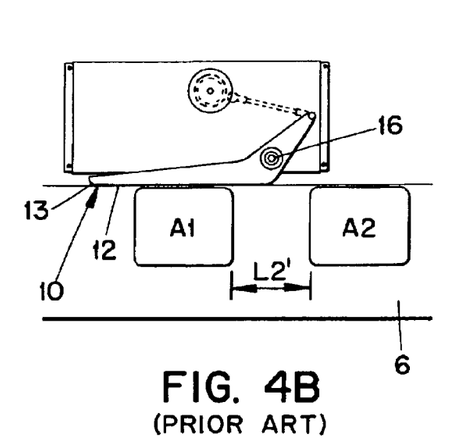
Figure 5A:
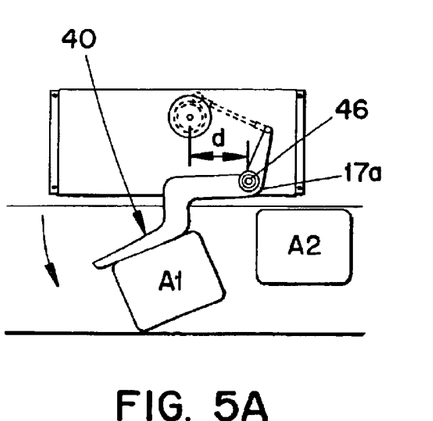
FIGS. 5A and 5B illustrate the first quarter of a diverter blade cycle for an exemplary diverter blade and a conventional diverter blade, respectively.
Figure 5B:
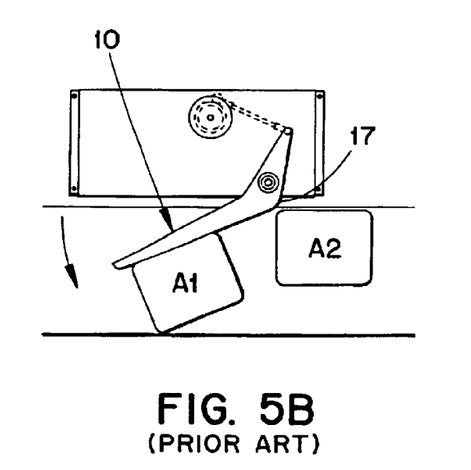

Advantages of the present diverter system will become apparent from FIGS. 4A through 7B, wherein FIGS. 4A, 5A, 6A and 7A depict the operation of the present system, whereas FIGS. 4B, 5B, 6B and 7B depict what would happen if a prior art system were operated in the same manner as the present system. FIG. 4A illustrates the diverter blade 40 of FIG. 3 in a retracted position along one side of a conveying surface 6. At this point in the cycle, a leading article A1 has reached a pushing position of the pusher surface 42. The subsequent article A2 is spaced apart from article A1 by a distance L2' equal to a value less than the cycle time multiplied by the speed of the conveyor (i.e., distance L2' is less than the distance L2 shown in FIG. 2A). FIG. 5A illustrates a partial extension stroke of the diverter blade 40 in which the pusher surface 42 is pushing the article A1 across the conveyor 6. The subsequent article A2 has moved along the conveyor 6 to a point close to the rotary axis 16.

Figure 6A:
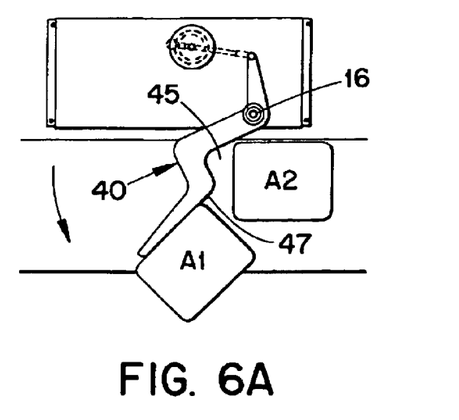
FIGS. 6A and 6B illustrate the second quarter of a diverter blade cycle for an exemplary diverter blade and a conventional diverter blade, respectively.

FIG. 6A illustrates the diverter blade 40 in its fully extended position, having pushed the leading article A1 to the opposite edge 22 of the conveyor 6. The front edge of the subsequent article A2 has traveled forwardly past the rotary axis 16 and thus past a rear corner 17a of the blade 40.

Figure 7A:
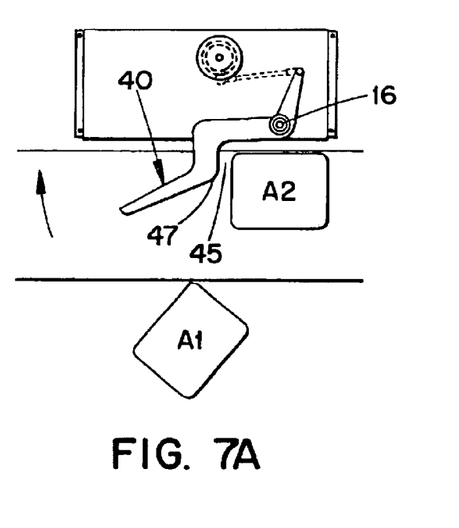
FIGS. 7A and 7B illustrate the third quarter of a diverter blade cycle for an exemplary diverter blade and a conventional diverter blade, respectively.

FIG. 7A illustrates the diverter blade 40 in a partially retracted portion of the cycle, in which the diverter blade 40 is being rotated about its rotary axis 16 from the extended position toward the retracted position. The subsequent article A2 has moved along the conveyor 6 to a position yet farther forwardly of the rotary axis 16 but rearwardly of a rear corner 47 of the pusher surface 42. The article A2 is thus positioned in the void 45 formed in the side of the blade facing toward the articles on the conveyor 6.

Since the rear section 52 of the connecting portion disposed immediately forwardly of the rotary axis is configured to extend away from the conveyor edge in the fully retracted position of the diverter blade (FIG. 4A), that means that during travel of the blade in a retraction stroke, the rear end of the connecting portion 52 will become situated outside of the conveyor before the pusher portion becomes so situated. Thus, the subsequent article A2 can pass forwardly of the pivot axis 16 before the diverter blade has returned to its retracted position, without contacting the blade. Even more preferably, the subsequent article A2 passes forwardly of the pivot axis with the blade disposed in a fully extended state without. contacting the blade. That means that the subsequent article A2 can be situated closer to the leading article A1 without risk of prematurely abutting the diverter blade, than would be otherwise possible. In other words, the distance L2' can be shorter than the cycle distance L2 of FIG. 2A.

Figure 6B:
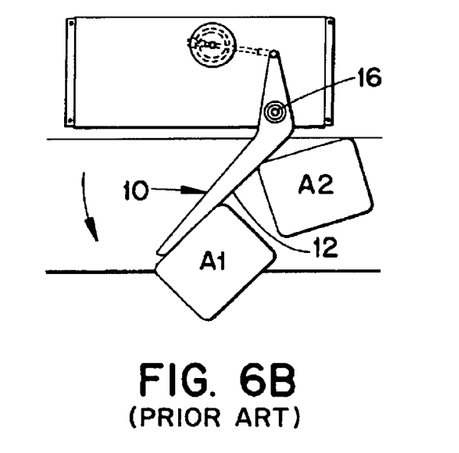

For comparison purposes, FIGS. 4B, 5B, 6B, 7B illustrate the path of articles A1 and A2 along the conveyor when using a conventional diverter blade 10 and employing the shorter cycle distance L2' of FIG. 4A. Initially, as shown in FIG. 4B, articles A1 and A2 begin in the same position as the articles A1 and A2 of FIG. 4A. During the extension stroke shown in FIG. 5B, the article A1 is being pushed across the conveying surface 6 by the blade 10. The subsequent article A2 has moved along the conveying surface 6 to a point aligned with the rear edge of the pusher surface 12 as occurred in FIG. 5A. As shown in FIG. 6B, the diverter blade 10 is in its fully extended position with the article A1 having been pushed across the conveyor 6. The subsequent article A2 has now moved to a point on the conveyor 6 so that its leading edge is positioned forwardly of the rotary axis 16. Because there is no recessed portion between the rotary axis 16 and the pusher surface 12, the moving article A2 would be struck by the pusher surface 12 while the blade 10 is still extended over the conveyor. The article A2 would therefore be displaced from its desired travel path by the blade 10 as shown in FIG. 6B.

Figure 7B:
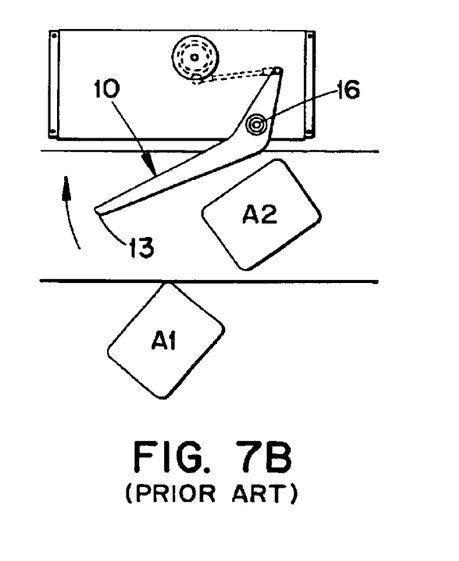

FIG. 7B illustrates the retraction stroke of the conventional diverter blade 10. As illustrated in FIG. 7B, article A1 has been pushed completely from the conveying surface 6, and article A2 has moved along the conveying surface to a point forward of the rotary axis 16. Because the diverter blade 10 has been struck by the article A2, article A2 will be undesirably displaced from its intended travel path (or possibly even displaced off the conveyor), will be delayed in its forward travel. The package A2 has previously had its position on the conveyor detected (e.g., a bar code on the package A2 having been scanned by a reader), and thus the control system of the sorting mechanism expects the package A2 to reach its respective branch conveyor at a certain instance, at which instance the respective diverting blade will be actuated. However, that the moment when that instance occurs will now have been changed, so the package A2 will arrive late and not be properly diverted by the blade.

Thus, when using a diverter blade 10 which is completely linear from the axis 16 to the free end 13, the packages must be spaced farther apart (i.e., by the longer cycle distance L2) than when using the diverter blade according to the invention.

The diverter blades and diverting system illustrated in FIG. 3–3C thus allow the conveying system to sort items which are spaced closer together than would be possible with a completely linear blade, so the conveying system has a higher throughput capacity.

By referring again to FIG. 7A, it is seen that the length of the connecting portion 44 of the blade 40 is sufficient for the subsequent article A2 to move along the conveyor without striking the forward part of the diverter blade 40 which extends over the conveyor during the retraction stroke. For example, in an exemplary embodiment, the rear end of the pusher surface 42 is spaced apart from the rotary axis 16 by a distance d (FIG. 5A) of at least ¼, more preferably ½, and most preferably ⅔ of the total length of the pusher surface. Even more advantageously, the distance could be at least ⅔ of the total length of the pusher surface.

The conveyor 6 can have any type of conveying surface. For example, the conveyor can be an endless conveyor belt or a bed of driven rollers arranged to move articles along their upper portions which together define a conveying surface. In an exemplary embodiment, the conveyor 6 has a generally horizontal conveying surface, and the diverter blade 40 is arranged for rotation about a vertical rotary axis so that the diverter blade rotates in a horizontal plane over the conveying surface 6.

It is noted that the figures illustrate articles moving along the conveyor at an edge 20 closest to the diverter. However, the articles can also be positioned at any transverse location on the conveyor. As one example, luggage moving along a conveyor is of various sizes and shapes, and is not typically aligned with one edge of the conveyor. Articles which are positioned farther from the edge 20 in the transverse direction are less likely to be inadvertently moved by the diverter blade due to too-close spacing between subsequent articles. However, because it is not known what the transverse position of each article will be, the required spacing between the articles can advantageously be set based on the most severe situation in which the articles are positioned at the edge 20 of the conveyor.

The length of the blade can advantageously be sufficiently long to effectively divert the articles on the conveyor, regardless of their transverse position. In one embodiment, the blade is long enough to extend across the entire width of the conveyor. In one example, a blade for use in luggage sorting systems can have a length of approximately 56 inches from the axis 16 to the front tip 43. The blade can be arranged so that the end of the blade extends over the entire width of the conveyor or at least to within a few inches of the far edge of the conveyor.

Figure 8:
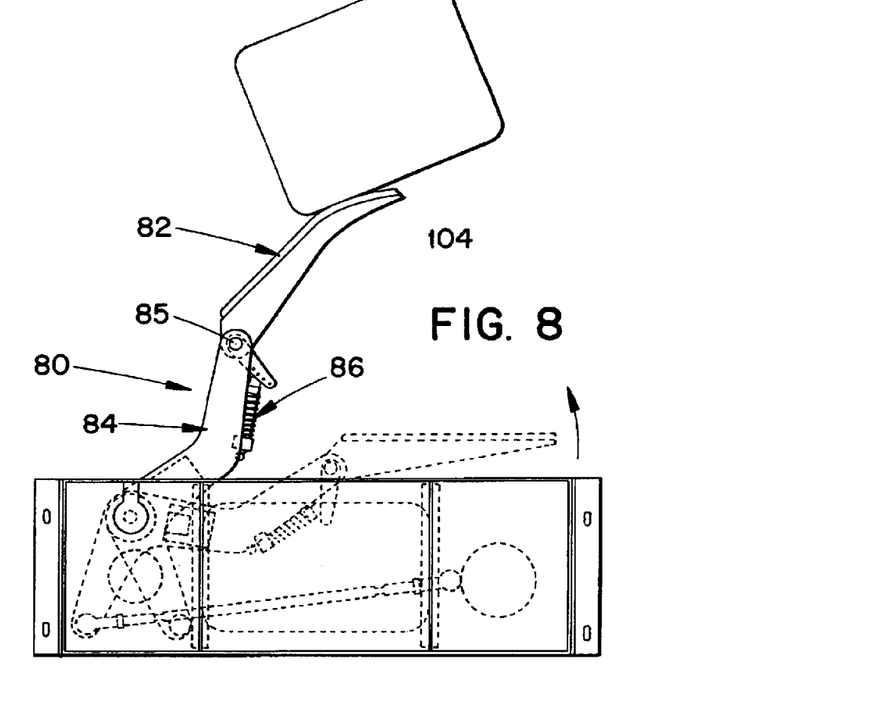
FIG. 8 illustrates an embodiment of a diverter blade which minimizes impacts to packages.
Figure 9:
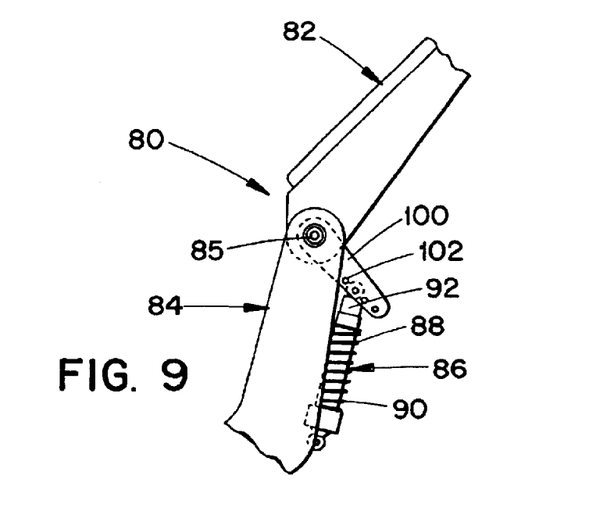
FIG. 9 is an enlargement of a portion of FIG. 8.

Another aspect of the invention involves a diverter blade which minimizes impact upon the packages. Such a diverter blade 80 is depicted in FIG. 8. The blade 80 is shaped similarly to the blade 40 of FIG. 3, except that the pusher section 82 is pivotably mounted to the connector section 84 or 85. Furthermore, a shock absorbing mechanism 86 interconnects the pusher section 82 and the connector section 84. The shock absorbing mechanism 86 could, for example, comprises a coil compression spring 88 in which is disposed a motion damper, such as a cylinder 90 having a self-contained supply of flowable medium in which a piston is disposed. The cylinder 90 could be connected to the connector section 84, whereas the piston would be connected to a rod 92 which would be connected to an arm 100 that is integral with the pusher section. Thus, when the pusher section abuts a package during the blade's extension stroke, the pusher section will be rearwardly pivoted about the pivot 85 against the action of the spring 88 to absorb energy that would otherwise be imparted to the package. After the package has been diverted, the spring 88 will return the pusher section to its original state, under the control of the damper 86. Thus, possible damage to the package can be minimized. The arm 100 possesses a number of holes 102 to which the damper can be connected, thereby varying the influence of the shock absorber on the pusher portion.

While the pivoted pusher section 82 has been shown in a diverter arm possessing the inventive shape earlier described, it could instead be embodied in a blade of any shape, such as the prior art shape of FIG. 2.

Additionally, the blade section can be partially formed of an elastic material, e.g., urethane, whereby the free end 104 of the pusher section can flex elastically, upon contacting a package as shown in FIG. 8, to further minimize shock to the package.

Although the present invention has been described in connection with preferred embodiments, it will be appreciated by those skilled in the art that additions, deletions, modification and substitutions not specifically described may be made without departing from the spirit and scope of the invention as defined in the appended claims.

What is claimed is:

1. A conveying system for conveying and selectively diverting articles, comprising:
   a conveyor for conveying articles in a longitudinally downstream direction, the conveyor having a conveying surface defining a longitudinal edge; and
   a diverter blade arranged to be rotated about a generally vertical rotary axis from a retracted position along the longitudinal edge of the conveying surface to an extended position across the conveying surface to displace an article;
   the diverter blade forming a pusher portion defining a pusher surface spaced downstream of the rotary axis;
   the diverter blade having a void arranged between the rotary axis and the pusher portion for enabling a subsequent article to pass downstream of the axis without contacting the diverter blade while the diverter blade is in an extended position.

2. A conveying system according to claim 1, wherein the pusher surface is spaced apart from the rotary axis in a direction of conveyance by a distance of at least ¼ of a length of the pusher surface.

3. A conveying system according to claim 2 wherein the distance is at least ½ of the length of the pusher surface.

4. A conveying system according to claim 2, wherein the distance is at least ⅔ of the length of the pusher surface.

5. A conveying system according to claim 1, further comprising a torque-transmitting member connected to the diverter blade for rotating the diverter blade.

6. A conveying system according to claim 1, wherein the pusher portion is connected to the axis by a connection portion, an intersection of the connecting portion and the pusher surface forming a step.

7. A conveying system according to claim 1, wherein the pusher surface is planar.

8. A conveying system according to claim 1, wherein the pusher surface is curved as viewed in a vertically downward direction.

9. A conveying system according to claim 1 wherein the pusher portion is connected to the axis by a connecting portion, the pusher portion being pivotably mounted to the connecting portion, and a shock absorbing mechanism connected between the pusher portion and the connecting portion.

10. The conveying system according to claim 9 wherein the pusher surface is elastic to absorb shock.

11. The conveying system according to claim 1 wherein the pusher surface is elastic to absorb shock.

12. A conveying system according to claim 1, wherein the connecting portion having a connector surface facing the conveyor edge, the pusher surface being positioned closer to the conveyor than is the connector surface, in the retracted position of the diverter blade.

13. A conveying system for conveying and selectively diverting articles, comprising:
   a conveyor for conveying articles in a longitudinally downstream direction, the conveyor having a conveying surface defining a longitudinal edge; and
   a diverter blade arranged to be rotated about a generally vertical rotary axis from a retracted position along the longitudinal edge of the conveying surface to an extended position across the conveying surface to displace an article,
   the diverter blade having a pusher portion defining a pusher surface spaced downstream of the rotary axis by a connecting portion of the diverter blade,
   wherein a section of the connecting portion disposed immediately downstream of the rotary axis extends in a direction away from the edge of the conveying surface in the retracted position of the diverter blade, wherein the section avoids contact with a subsequent article while the diverter blade is in an extended position.

14. A method of selectively diverting articles from a conveyor by a diverter blade positioned next to a longitudinal edge of the conveyor, the blade including a pusher portion arranged to move across the conveyor between retracted and fully extended positions in response to a pivoting of the diverter blade about a generally vertical axis, the axis being spaced from the pusher portion in a direction opposite a longitudinal direction of article conveyance, the method comprising the steps of:
   A) conveying the articles in a longitudinal downstream direction, with a side of the articles disposed adjacent the longitudinal edge of the conveyor, and with a first of the articles spaced downstream of a second of the articles;
   B) maintaining the diverter blade in the retracted position until the first article reaches a position adjacent the pusher portion of the retracted diverter blade; then
   C) pivoting the diverter blade from the retracted position to the fully extended position to cause the pusher portion to push the first article from the conveyor; then
   D) pivoting the diverter blade from the fully extended position to the retracted position; and
   E) causing the second article to pass downstream of the pivot axis and into a void formed by the diverter blade prior to the diverting blade reaching the retracted position during steps C and D, to avoid contact between the trailing article and the diverter blade.

15. The method according to claim 14, wherein the diverter blade travels from the position to the fully extended position and then back to the retracted position in a cycle time, and the conveyor travels at a conveying speed, wherein a spacing between the first and second articles during step A is shorter than the cycle time multiplied by the conveying speed.

* * * * *